United States Patent
Kiuchi

(10) Patent No.: US 9,209,470 B2
(45) Date of Patent: Dec. 8, 2015

(54) MANUFACTURING METHOD AND APPARATUS FOR ELECTROLYTE MEMBRANE WITH GASKETS

(71) Applicant: TOPPAN PRINTING CO., LTD., Tokyo (JP)

(72) Inventor: Shuji Kiuchi, Kita-katsushika-gun (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 265 days.

(21) Appl. No.: 14/026,419

(22) Filed: Sep. 13, 2013

(65) Prior Publication Data

US 2014/0030614 A1     Jan. 30, 2014

Related U.S. Application Data

(63) Continuation of application No. PCT/JP2012/056313, filed on Mar. 12, 2012.

(30) Foreign Application Priority Data

Mar. 18, 2011   (JP) .................. 2011-061197

(51) Int. Cl.
*H01M 8/10*      (2006.01)
*H01M 8/02*      (2006.01)
*B32B 38/18*     (2006.01)

(52) U.S. Cl.
CPC ............. *H01M 8/10* (2013.01); *B32B 38/1808* (2013.01); *H01M 8/0273* (2013.01); *H01M 8/0286* (2013.01); *B32B 2309/02* (2013.01); *B32B 2309/14* (2013.01); *H01M 8/1018* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 6,086,694 A | 7/2000 | Winter et al. |
|---|---|---|
| 2004/0241525 A1 | 12/2004 | Mekala et al. |
| 2007/0175584 A1 | 8/2007 | Merlo et al. |
| 2009/0269671 A1 | 10/2009 | Kim et al. |

FOREIGN PATENT DOCUMENTS

| JP | A-2006-286430 | 10/2006 |
|---|---|---|
| JP | A-2007-503704 | 2/2007 |
| JP | A-2007-180031 | 7/2007 |
| JP | A-2009-64633 | 3/2009 |
| WO | WO 2004/028706 A1 | 4/2004 |

OTHER PUBLICATIONS

International Preliminary Report on Patentability mailed Oct. 2, 2013 in corresponding International Patent Application No. PCT/JP2012/056313.
Extended European Search Report mailed Dec. 5, 2014 in corresponding European Patent Application No. 12760292.8.
International Search Report issued in International Patent Application No. PCT/JP2012/056313 mailed Jun. 12, 2012.

*Primary Examiner* — Miriam Stagg
*Assistant Examiner* — Carmen Lyles-Irving

(57) ABSTRACT

There is a manufacturing apparatus for an electrolyte membrane with gaskets by laminating an electrolyte membrane having a predetermined region on which a catalyst layer is formed and a gasket formed with an opening shaped to match the shape of the region of the catalyst layer. The manufacturing apparatus for an electrolyte membrane with gaskets includes a laminating roller that abuts on the gasket to laminate the electrolyte membrane and the gasket. The laminating roller has a surface on which a protrusion is formed. The protrusion is shaped to fit in the opening of the gasket. The manufacturing apparatus for an electrolyte membrane with gaskets includes a roller controller that operates the laminating roller such that the electrolyte membrane and the gasket are laminated while the protrusion is fitted in the opening of the gasket.

8 Claims, 7 Drawing Sheets

MANUFACTURING METHOD AND APPARATUS FOR ELECTROLYTE MEMBRANE WITH GASKETS

This is a Continuation of Application No. PCT/JP2012/056313 filed Mar. 12, 2012, which claims the benefit of Japanese Patent Application No. 2011-061197 filed Mar. 18, 2011. The disclosure of the prior applications is hereby incorporated by reference herein in its entirety.

TECHNICAL FIELD

The present disclosure relates to manufacturing methods and apparatuses for electrolyte membranes with gaskets, and, more particularly, to such manufacturing methods and apparatuses including placing a gasket member on an electrolyte membrane.

BACKGROUND ART

Catalyst Coated Membranes, referred to simply as CCMs, with gaskets used for fuel cells and the like have been developed. A CCM with gaskets is comprised of an electrolyte membrane, on each side of which a gasket and electrode catalyst layers is formed. A process for obtaining a CCM with gaskets, which is disclosed in patent document 1, is knows as one of methods for manufacturing CCMs with gaskets.

The process disclosed in the patent document 1 uses an original fabric roll on which a catalyst coated membrane (CCM) consisting of an electrolyte membrane band on which catalyst layers are formed at regular intervals is wound. The process unwinds the CCM from the original roll to feed it. Then, the process applies pressure to a gasket having openings on the CCM using a pair of rolls to form a CCM with the gasket. The process configured set forth above is capable of manufacturing a plurality of CCMs with gaskets from a band-shaped catalyst coated membrane (CCM).

CITATION LIST

Patent Document

Patent document 1: Japanese Patent Laid-Open No. 2007-180031

SUMMARY OF INVENTION

Problem to be Solved by Invention

The process disclosed in the patent document 1 requires alignment between the catalyst-layer formed regions and the corresponding openings of the gasket. However, the known technologies may result in misalignment between the catalyst-layer formed regions and the corresponding openings of the gasket. In expectation of such misalignment of the catalyst layers, a method for forming larger openings of a gasket was proposed. However, this method may remain some portions of the electrolyte membrane uncovered with the gasket, resulting in reduction of the durability. In addition, gaskets normally have a thickness of the order of tens of micrometers and a frame shape. This may make it difficult to maintain the shapes of gaskets, resulting difficulty laminating a gasket and an electrolyte membrane with high accuracy.

In order to solve these problems, the present invention aims to provide methods and apparatuses for manufacturing electrolyte membranes with gaskets, which are capable of laminating a gasket on a predetermined region of an electrolyte membrane with high accuracy.

Means for Solving Problem

In order to solve the problems, the present application employs the following structures. Specifically, a first invention is a manufacturing apparatus for an electrolyte membrane with gaskets by laminating an electrolyte membrane having a predetermined region on which a catalyst layer is formed and a gasket formed with an opening shaped to match the shape of the region of the catalyst layer. The manufacturing apparatus for an electrolyte membrane with gaskets includes a laminating roller that abuts on the gasket to laminate the electrolyte membrane and the gasket. The laminating roller has a surface on which a protrusion is formed, and the protrusion is shaped to fit in the opening of the gasket. The gasketed-membrane manufacturing apparatus includes a controller that operates the laminating roller such that the electrolyte membrane and the gasket are laminated while the protrusion is fitted in the opening of the gasket.

A second invention is that the protrusion of the laminating roller has a shape similar to the opening of the gasket in plan view.

A third invention is that the protrusion of the laminating roller has a height that is substantially identical to a thickness of the gasket.

A fourth invention is that the protrusion of the laminating roller is made from an elastic member.

A fifth invention is that the opening has a plurality of sides forming a polygon shape surrounded by the plurality of sides, and the shape of the protrusion in plan view has a plurality of sides forming a polygon shape. A length of each side of the protrusion is shorter than that of a corresponding side of the opening by a range from 5 μm to 100 μm inclusive.

A sixth invention is that the gasket has a band shape, the opening is provided in plurality, the plurality of openings are formed in the gasket at first regular intervals, the laminating roller has a cylindrical shape, the protrusion is provided in plurality, the plurality of protrusions are formed on an outer circumferential surface of the laminating roller at second regular intervals, the second regular intervals are previously determined to match the first regular intervals, and the controller turns the laminating roller to laminate the electrolyte membrane and the gasket while the plurality of protrusions are successively fitted in the plurality of openings.

A seventh invention is that the laminating roller consists of two laminating rollers disposed to face each other, and the controller operates the two laminating rollers such that the gasket is laminated on each of front and back sides of the electrolyte membrane.

An eighth invention is that a manufacturing method for an electrolyte membrane with gaskets by laminating an electrolyte membrane having a predetermined region on which a catalyst layer is formed and a gasket formed with an opening shaped to match the shape of the region of the catalyst layer. The manufacturing method for an electrolyte membrane with gaskets includes the steps of: fitting a protrusion in the opening of the gasket, the protrusion being formed on a surface of a laminating roller that abuts on the gasket to laminate the electrolyte membrane and the gasket; and operating the laminating roller such that the electrolyte membrane and the gasket are laminated while the protrusion is fitted in the opening of the gasket.

Effect of the Invention

The present invention laminates the electrolyte membrane and the gasket while the protrusion is fitted in the opening of the gasket. This makes it possible to easily laminate the gasket on a predetermined position of the electrolyte membrane with high accuracy. That is, it is possible to prevent misalignment between the opening of the gasket and the catalyst-layer portion of the catalyst coated membrane.

DESCRIPTION OF EMBODIMENT

First Embodiment

A manufacturing apparatus 1 and a manufacturing method for an electrolyte membrane with a gasket according to a first embodiment of the present invention will be described hereinafter.

First, an electrolyte membrane with gaskets 14 to be manufactured by the manufacturing apparatus 1 will be described. The electrolyte membrane with gaskets 14 is manufactured by laminating a gasket 13 on a catalyst coated membrane 10 by the manufacturing apparatus 1.

Figure 1:
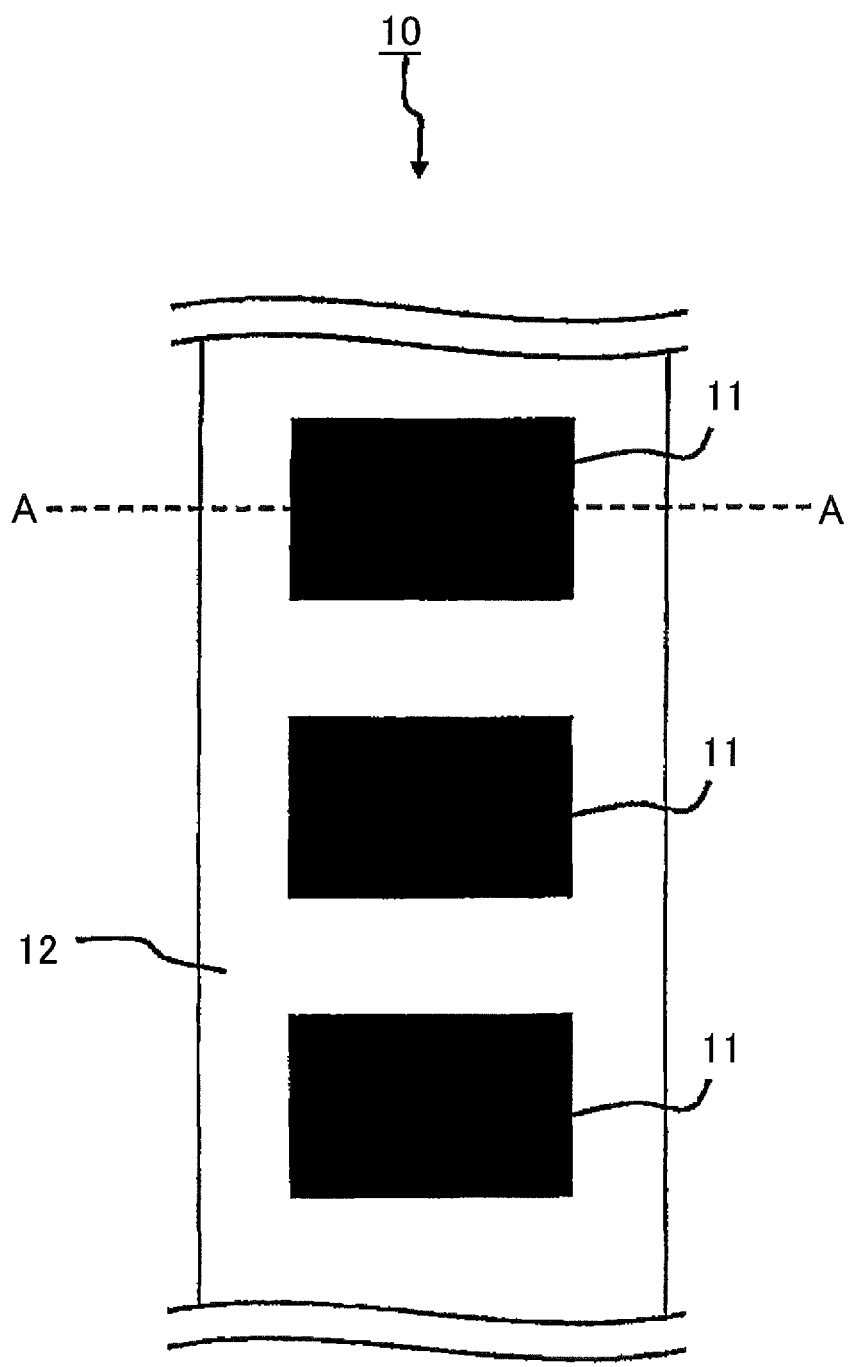
FIG. 1 is a plan view of a catalyst coated membrane 10 according to a first embodiment of the present invention.
Figure 2:
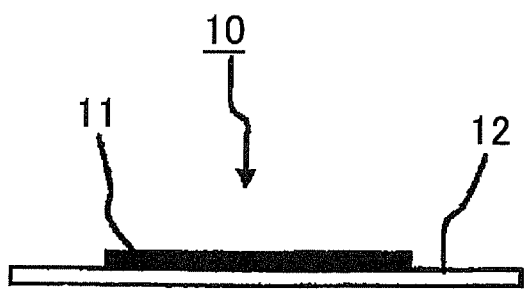
FIG. 2 is a cross sectional view of the catalyst coated membrane 10 according to the first embodiment of the present invention.

A structure of the catalyst coated membrane 10 will be described with reference to FIGS. 1 and 2. FIG. 1 is a plan view of the catalyst coated membrane 10. FIG. 2 is a cross sectional view of the catalyst coated membrane 10 taken on line A-A of FIG. 1. Referring to FIGS. 1 and 2, the catalyst coated membrane 10 is comprised of a polymer electrolyte membrane, referred to simply as an electrolyte membrane, 12 on which catalyst layers 11 are fanned. In detail, the catalyst coated membrane 10 is comprised of a wetting polymer electrolyte membrane 12 having good proton-conducting characteristics and the catalyst layers 11 formed on the polymer electrolyte membrane 12; each of the catalyst layers 11 is made from resin and powdered carbon supporting a catalyst made from platinum or an alloy of platinum and another metal. In this embodiment, the catalyst layers 11, each of which has a rectangular shape in a plan view, are formed on one side of the band polymer electrolyte membrane 12 at regular intervals as an example.

Hereinafter, specific examples of materials, which constitute the polymer electrolyte membrane 12 and the catalyst layers 11, will be described, but the present invention is not limited to these materials.

For example, fluoropolymer electrolytes or hydrocarbon polymer electrolytes can be used as polymer materials constituting the polymer electrolyte membrane 12. As a fluorine polymer electrolyte, Nafion® manufactured by DuPont, Flemion® manufactured by Asahi Glass Co., Ltd, Aciplex® manufactured by Asahi Glass Co., Ltd, Gore Select® manufactured by Gore, or the like can be used. As a hydrocarbon polymer electrolyte membrane, an membrane made from sulfonated polyether ketone, sulfonated polyether sulfone, sulfonated polyether ether sulfone, sulfonated polysulfide, sulfonated polyphenylene, or the like can be used. Particularly, as a hydrocarbon polymer electrolyte membrane, DuPont's Nafion® materials can be preferably used. The polymer electrolyte membrane 12 substantially has a thickness defined by the range from 10 µm to 300 µm inclusive.

As resins constituting the catalyst layers 11, materials, which are the same as those used as the polymer materials, can be used. As catalysts constituting the catalyst layers 11, (i) the platinum group elements, which include platinum, palladium, ruthenium, iridium, rhodium, and osmium, (ii) metals, such as iron, lead, copper, chrome, cobalt, nickel, manganese, vanadium, molybdenum, gallium, aluminum, and so on, (iii) alloys of these, (iv) oxides of these, or (v) multiple oxides of these can be used. The particle size of the catalysts is preferably within the range from 0.5 nm to 20 nm inclusive. This is because, if the particle size were too large, this would reduce the activity of the catalysts, and if the particle size were too small, this would reduce the stability of the catalysts.

As powdered carbons constituting the catalyst layers 11, any types of finely powdered conductive carbons resistant to the catalysts can be used. Preferably, carbon-black, graphite, black lead, activated carbon, carbon nanotubes, or fullerene can be used as the powdered carbons. The particle size of the powdered carbons is preferably within the range from 10 nm to 100 nm inclusive as long as it is larger than the particular size of the catalysts.

Figure 3:
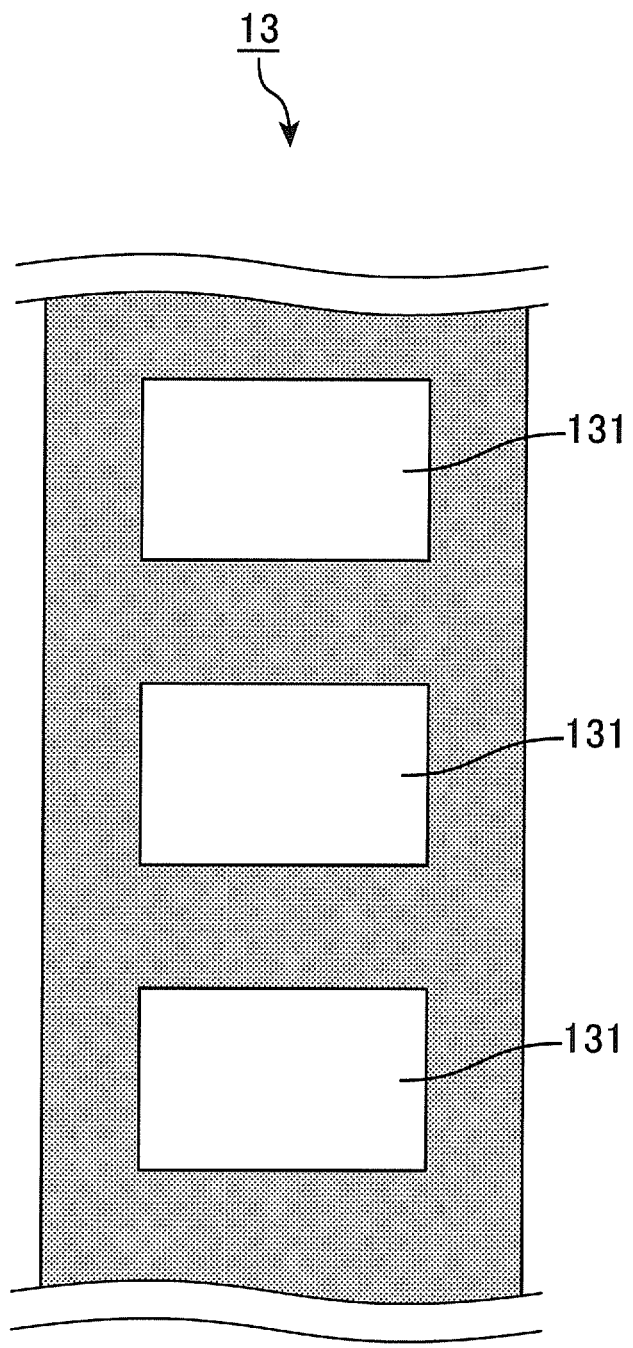
FIG. 3 is a plan view of a gasket 13 according to the embodiment of the present invention.

A structure of the gasket 13 will be described with reference to FIG. 3. FIG. 3 is a plan view of the gasket 13. The gasket 13 is, for example, a sheet member made from a polymer material, such as an engineering plastic material and a super engineering plastic material, used as a base material. Referring to FIG. 3, the gasket 13 is provided with openings 131 formed therethrough at regular intervals as first intervals. The intervals between the openings 131 are previously defined in alignment with the intervals of the catalyst layers 11. The intervals of the catalyst layers 11 are defined based on the size of target MEAs. The shapes of each of the openings 131 is preferably matched with the size and the shape, such as a polygon shape surrounded by plural sides, of a corresponding one of the catalyst layers 11 in a plan view. In this embodiment, the openings 131 are each formed as a rectangular shape in a plan view.

Figure 4:
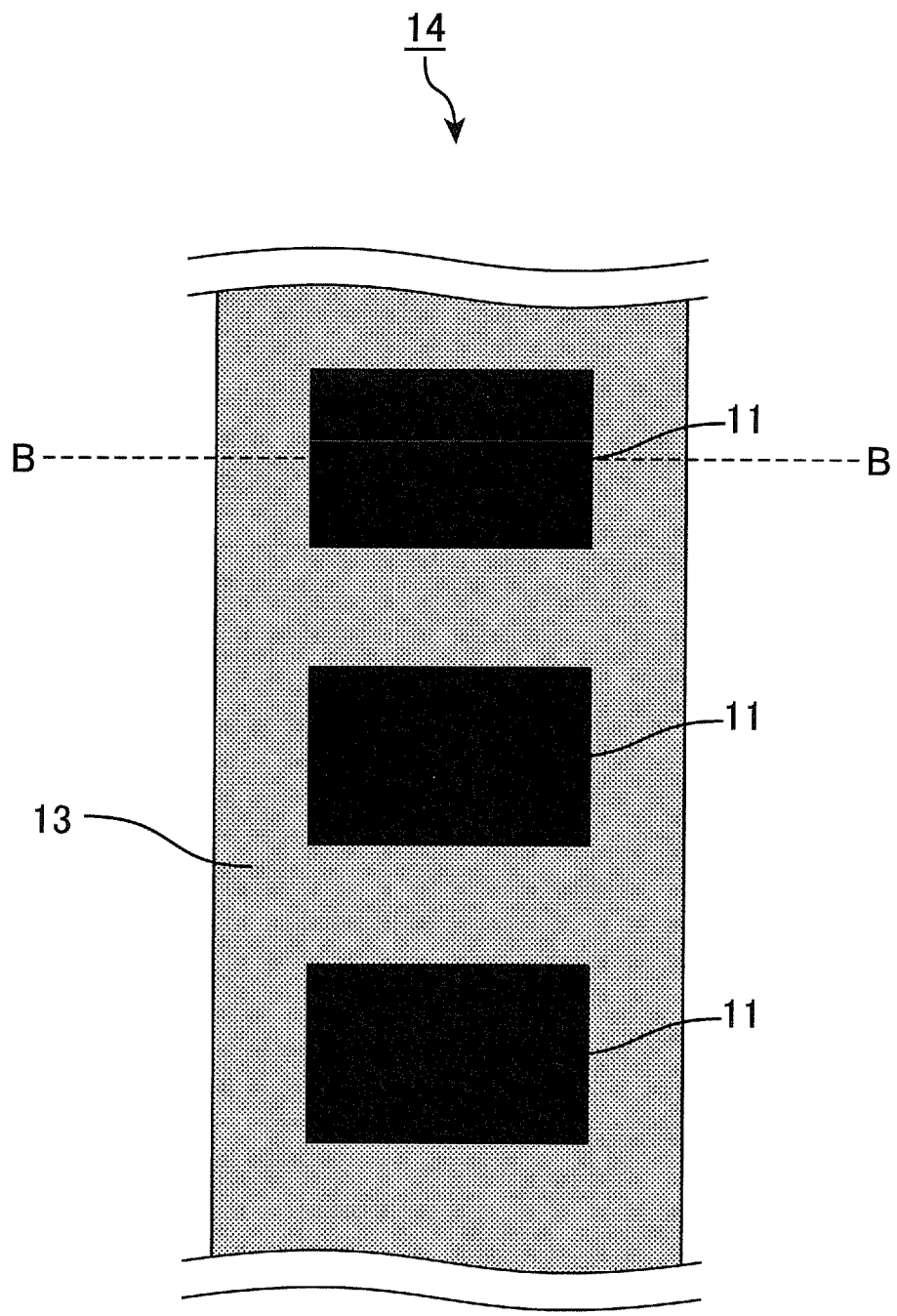
FIG. 4 is a plan view of an electrolyte membrane with gaskets 14 according to the first embodiment of the present invention.
Figure 5:
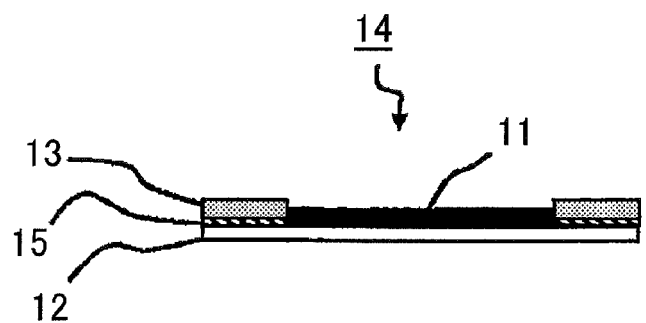
FIG. 5 is a cross sectional view of the electrolyte membrane with gaskets 14 according to the first embodiment of the present invention.

A structure of the electrolyte membrane with gaskets 14 will be described hereinafter with reference to FIGS. 4 and 5. FIG. 4 is a plan view of the electrolyte membrane with gaskets 14. FIG. 5 is a cross sectional view of the electrolyte membrane with gaskets 14 taken on line B-B of FIG. 4. Referring to FIGS. 4 and 5, the electrolyte membrane with gaskets 14 is comprised of the polymer electrolyte membrane 12 and the gasket 13 bonded on the one side of the polymer electrolyte membrane 12. During the bonding, the catalyst layers 11 of the polymer electrolyte membrane 12 are fitted in the corresponding openings 131 of the gasket 13, respectively. In other words, the gasket 13 is placed to surround the catalyst layers 11. For example, the gasket 13 is adhered to the polymer electrolyte membrane 12 with a silicone- or epoxide-based adhesive.

Figure 6:
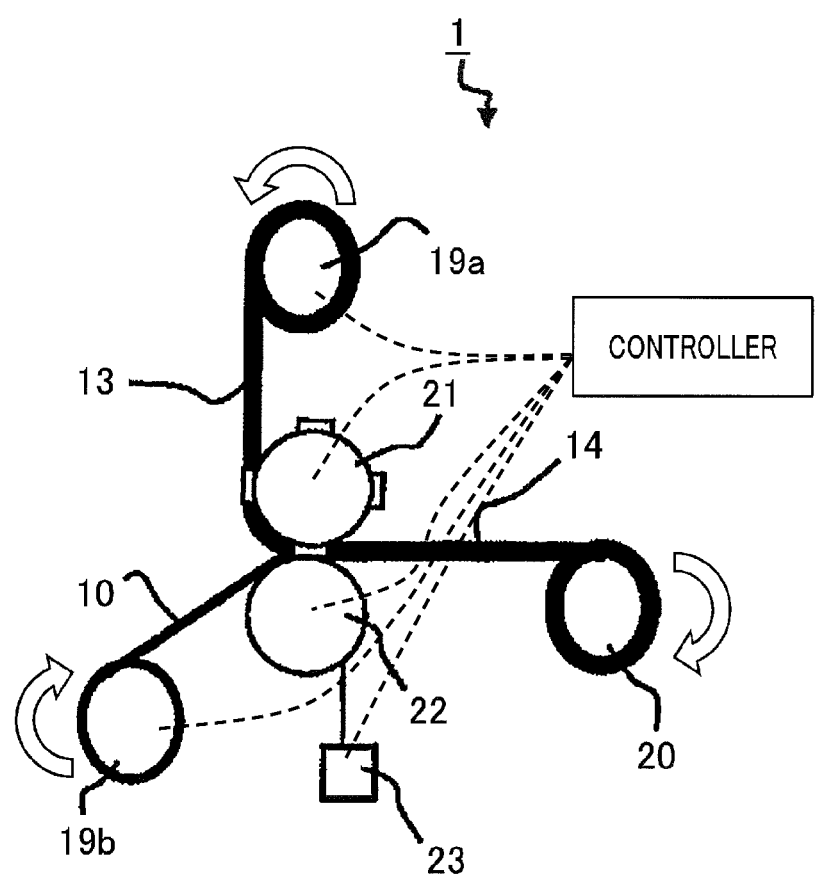
FIG. 6 is a schematic view of a manufacturing apparatus 1 for an electrolyte membrane with gaskets according to the first embodiment of the present invention.

Next, the manufacturing apparatus 1 according to the first embodiment of the present invention will be described hereinafter. FIG. 6 is a schematic view of the manufacturing apparatus 1 according to the first embodiment of the present invention.

The manufacturing apparatus 1 is comprised of a feeding roller 19a, a feeding roller 19b, a pressure bonding roller with protrusions 21, a pressure bonding roller 22, a pressure device 23, and a controller.

The feeding roller 19a is configured to feed, i.e. unwind, the gasket 13 wound in roll form. On one side of the gasket 13, which is to abut on the catalyst coated membrane 10, the adhesive 15 is previously coated. The feeding roll 19b is configured to feed the catalyst coated membrane 10 wound in roll form. The pressure bonding roller 22 is configured to press the catalyst coated membrane 10 and the gasket 13 together with the pressure bonding roller with protrusions 21, which is a convexed pressure bonding roller with protrusions. The pressure device 23 is connected to the pressure bonding roller 22, and configured to apply pressure between the pressure bonding roller with protrusions 21 and the pressure bonding roller 22. The controller is configured to control the operations of the feeding roller 19a, the feeding roller 19b, the convexed pressure bonding roller with protrusions 21, the pressure bonding roller 22, and the pressure device 23. Typically, the controller is comprised of an information processing unit, such as a CPU and the like, a storage unit, such as a memory, and an interface. In accordance with programs previously stored, the controller controls the feeding roller 19a, the feeding roller 19b, the convexed pressure bonding roller with protrusions 21, the pressure bonding roller 22, and the pressure device 23.

Figure 7:
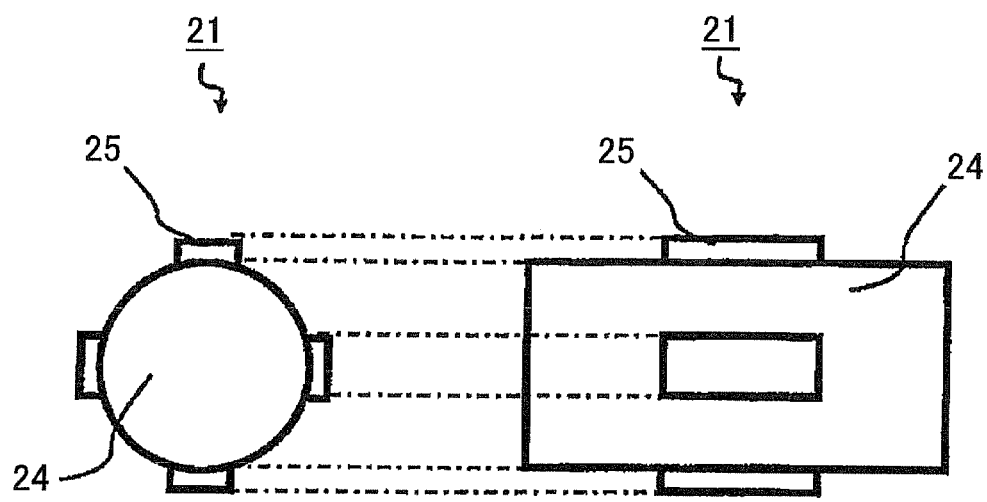
FIG. 7 is a schematic view of a pressure bonding roller with protrusions according to the first embodiment of the present invention.

The pressure bonding roller with protrusions 21 is a device that abuts on the gasket 13 to laminate the electrolyte membrane and the gasket. Referring to FIG. 7, the pressure bonding roller with protrusions 21 is comprised of a cylindrical body 24 and a plurality of protrusions 25 formed on the outer circumferential surface of the cylindrical body 24 at regular intervals as second intervals matching the regular intervals, i.e. the first intervals, between the openings of the gasket. FIG. 7 schematically illustrates the pressure bonding roller with protrusions 21. Each protrusion 25 has a shape in a plan view; the shape is preferably so matched with a corresponding one of the openings 131 of the gasket 13 as to be fitted therein. Specifically, the shape of each protrusion 25 in a plan view is preferably similar to that of a corresponding opening 131. In this embodiment, each protrusion 25 is formed to have a rectangular shape in a plan view. The length of each side of the protrusion 25 is lower than a corresponding side of the opening 131 by the range from 5 µm to 120 µm inclusive. Preferably, the length of each side of the protrusion 25 is lower than a corresponding side of the opening 31 by the range from 5 µm to 100 µm inclusive. The height of the top surface of the protrusion 25 from the surface of the body 24, referred to as the height of the protrusion, is set to be substantially equal to the thickness of the gasket 13. Specifically, the height of the protrusion 25 is preferably set to be lower than the thickness of the gasket 13 by substantially the range from 0.1 µm to 50 µm inclusive. For example, cutting the surface of the body 24 produces the protrusions 25. The pressure bonding roller with protrusions 21 and the pressure bonding roller 22 are placed to face each other.

Next, the operation processes of the manufacturing apparatus 1 set forth above will be described hereinafter. First, the controller turns the pressure bonding roller with protrusions 21, the feeding roller 19a, and the feeding roller 19b synchronously with each other, so that protrusions 25 of the pressure bonding roller with protrusions 21 are respectively inserted into corresponding openings 131 of the gasket 13, and abut on corresponding catalyst layers. This operation causes the membrane 10 to be transferred while protrusions 25 are respectively fitted in corresponding openings 131 of the gasket 13. During this operation, because the length of each side of the protrusion 25 is lower than a corresponding side of the opening 131 by the range from 5 µm to 100 µm inclusive, it is possible to appropriately insert protrusions 25 of the pressure bonding roller 21 into corresponding opening 131 of the gasket 13, respectively.

The catalyst coated membrane 10 and the gasket 13 fed from the respective feeding rollers 19a and 19b are drawn to an interspace between the pressure bonding roller with protrusions 21 and the pressure bonding roller 22, so that the catalyst coated membrane 10 and the gasket 13 are laminated. During the lamination, the controller controls the pressure bonding roller with protrusions 21, the feeding roller 19a, and the feeding roller 19b in synchronous with one another, so that the center of the top surface of each protrusion 25 is in alignment with that of a corresponding catalyst-layer formed area of the membrane 10.

Next, the controller controls the pressure device 23 to apply pressure between the pressure bonding roller with protrusions 21 and the pressure bonding roller 22. The pressure supplied by the pressure device 23 is adjusted to a value lying within the range from 10 MPa to 100 MPa inclusive. The controller controls the pressure device 23 such that the pressure is uniformly applied to the catalyst coated membrane 10 and the gasket 13 while they are being laminated on each other. This control makes it possible to reduce deformation in the catalyst coated membrane 10 and the gasket 13 while they are being laminated on each other.

Note that, if the pressure were lower than the range from 10 MPa to 100 MPa inclusive, poor adhesive force might result in difficulty manufacturing the electrolyte membrane with gaskets 14. If the pressure were higher than the range from 10 MPa to 100 MPa inclusive, high pressure might result in deterioration of the electrolyte membrane with gaskets 14.

The electrolyte membrane with gaskets 14, which has been produced set forth above, is wound by a winding roller 20.

The manufacturing method and apparatus 1 for gasketed membranes according to this embodiment set forth above are configured to perform synchronous rotation of the feeding rollers 19a and 19b and pressure bonding rollers with protrusions 21 such that each opening 131 of the gasket 13 and a corresponding catalyst layer portion of the catalyst coated membrane 10 are aligned with a corresponding protrusion of the pressure bonding roller with protrusions 21a. This reduces misalignment between the catalyst layers of the electrolyte membrane with gaskets 14 and the corresponding openings 131 of the gasket.

Inserting a protrusion 25 of the pressure bonding roller 21a into an opening 131 of the gasket 13 thus laminating the gasket 13 on the catalyst coated membrane 10 permits pressure on the catalyst coated membrane 10 to be uniformed. This makes it possible to continuously produce the electrolyte membrane with gaskets 14 having a good shape while maintaining the shape of the gasket.

Note that the aforementioned amount of pressure applying the interspace between the pressure bonding roller with protrusions 21a and the pressure bonding roller 22 is an example, and another pressure depending on the material of the catalyst coated membrane 10 and/or the gasket 13 can be selectively used.

In the manufacturing apparatus according to this embodiment, the length of each side of the protrusion 25 is lower than a corresponding side of the opening 131 by the range from 5 μm to 100 μm inclusive, but another length can be used in consideration of the strength of the material of the gasket 13.

This embodiment shows an example in which cutting the surface of the body 24 produces the protrusions 25, but the protrusions 25 can be applied on the surface of the body 24, thus forming the pressure bonding roller with protrusions 21. As the material of the protrusions 25, an elastic member, such as rubber and sponge, a dissimilar metal, or the like can be selectively used. If the protrusions 25 are made from an elastic member, it is possible to suitably adjust the height of the protrusions 25, resulting in uniformity of pressure during lamination of the gasket 13 and the catalyst coated membrane 10. Thus, it is possible to prevent wrinkles being formed in the electrolyte membrane with gaskets 14.

The manufacturing apparatus 1 according to this embodiment performs lamination between the catalyst coated membrane 10 and the gasket 13 using pressure. The manufacturing apparatus 1 can be equipped with a heater in at least one of the pressure bonding roller with protrusions 21 and the pressure bonding roller 22 depending on the material configurations of the gasket 13 and/or the catalyst coated membrane 10. In this case, the manufacturing apparatus 1 can perform the lamination based on thermo-compression bonding.

The manufacturing apparatus 1 according to this embodiment applies a coating of the adhesive 15 on the gasket 13, and thereafter performs the lamination. The manufacturing apparatus 1 can apply a coating of the adhesive 15 on the catalyst coated membrane 10 depending on its materials.

Second Embodiment

Figure 8:
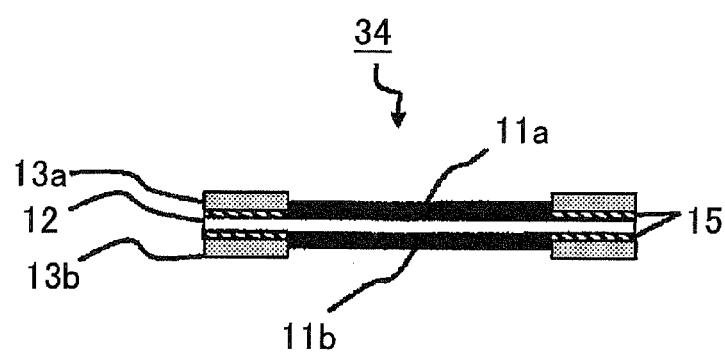
FIG. 8 is a cross sectional view of an electro membrane with gaskets 34 according to a second embodiment of the present invention.

In the first embodiment, the manufacturing apparatus 1 mounts the gasket 13 on one side of the catalyst coated membrane 10 to thereby manufacture an electrolyte membrane with gaskets 14. In contrast, the present invention can be configured to respectively mount gaskets 13a and 13b on both sides of a catalyst coated membrane 10 to thereby manufacture an electrolyte membrane with gaskets 34 (see FIG. 8). Note that FIG. 8 shows a cross sectional view of the electrolyte membrane with gaskets 34 according to a second embodiment.

Figure 9:
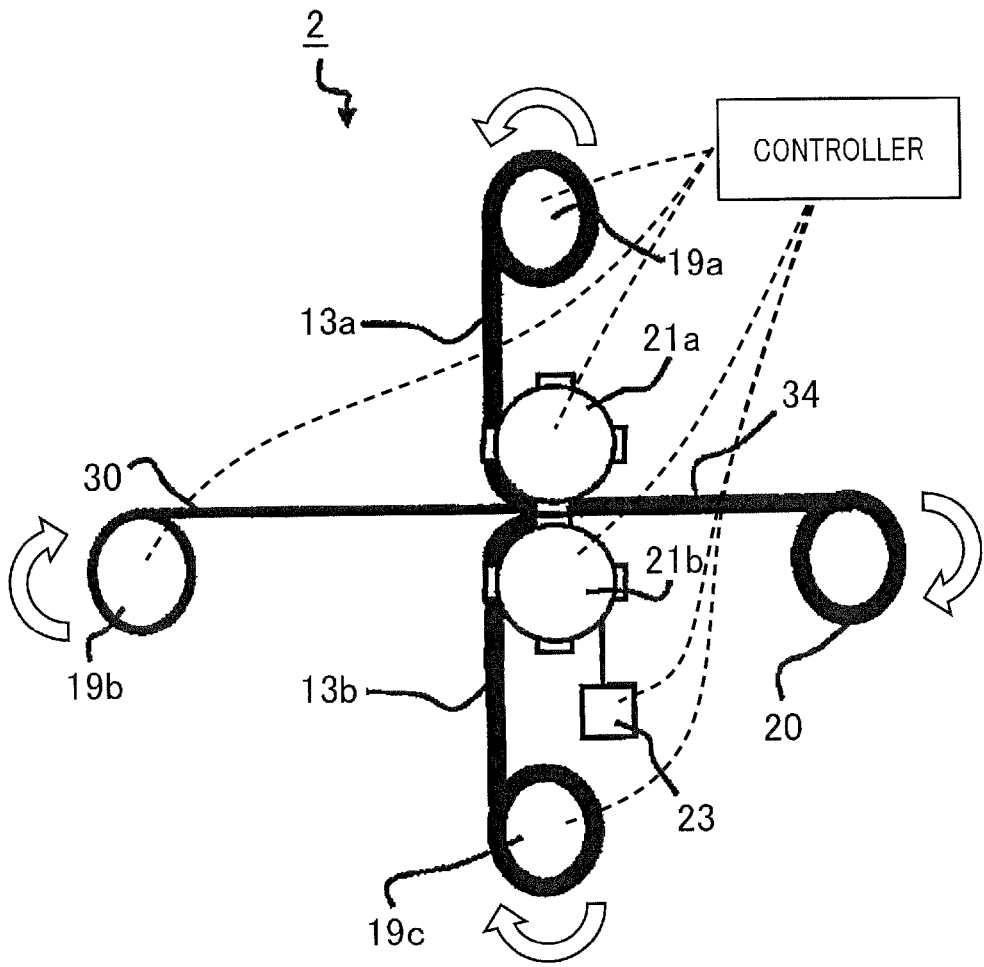
FIG. 9 is a schematic view of a manufacturing apparatus 2 for an electrolyte membrane with gaskets according to the second embodiment of the present invention.

FIG. 9 is a schematic view of a manufacturing apparatus 2 according to the second embodiment. Detailed descriptions of like parts between the first and second embodiments, to which like reference characters are assigned, are omitted.

The manufacturing apparatus 2 is further comprised of a feeding roller 19c, and of a pressure bonding roller with protrusions 21b in place of the pressure bonding roller 22. A pressure bonding roller with protrusions 21a is the same as the pressure bonding roller with protrusions 21. The pressure device 23 is connected to the pressure bonding roller with protrusions 21b. The pressure bonding rollers with protrusions 21a and 21b are placed to face each other.

Figure 10:
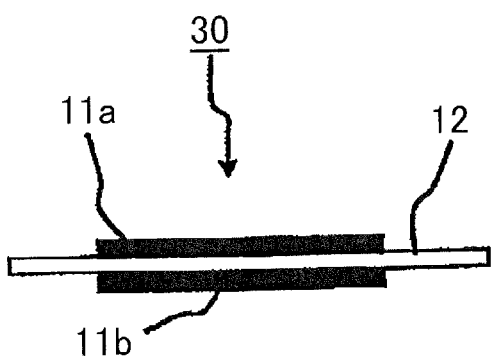
FIG. 10 is a cross sectional view of a catalyst coated membrane 30 according to the second embodiment of the present invention.

The manufacturing apparatus 2 manufactures the electrolyte membrane with gaskets 34 using a catalyst coated membrane 30 having a polymer electrolyte membrane 12, on front and back both sides of which catalyst layers 11a and 11b have been formed. FIG. 10 is a cross sectional view of the catalyst coated membrane 30 according to the second embodiment.

The feeding roller 19b feeds, i.e. unwinds, the catalyst coated membrane 30. The feeding roller 19a feeds, i.e. unwinds, a gasket 13a, and the feeding roller 19c feeds, i.e. unwinds, a gasket 13b.

The controller controls the feeding rollers 19a, 19b, and 19c, and the pressure bonding rollers with protrusions 21a and 21b synchronously with one another.

Specifically, the controller controls each roller to feed, i.e. unwind, the gaskets 13a and 13b, such that: protrusions 25 of the pressure bonding roller with protrusions 21a are respectively inserted into corresponding openings 131 of the gasket 13a, and protrusions 25 of the pressure bonding roller with protrusions 21b are respectively inserted into corresponding openings 131 of the gasket 13b.

The controller also controls the operations of each roller such that:
the center of a formed area of each catalyst layer 11a of the catalyst coated membrane 30 is in alignment with the position of a corresponding protrusion 25 of the pressure bonding roller with protrusions 21a; and
the center of a formed area of each catalyst layer 11b of the catalyst coated membrane 30 is in alignment with the position of a corresponding protrusion 25 of the pressure bonding roller with protrusions 21b.

The unwound gasket 13a and gasket 13b are drawn to an interspace between the pressure bonding rollers with protrusions 21a and 21b while protrusions 25 of each of the pressure bonding rollers with protrusions 21a and 21b are respectively inserted in corresponding openings 131. Next, the controller controls the pressure device 23 to apply pressure between the pressure bonding rollers with protrusions 21a and 21b, thus laminating the catalyst coated membrane 10 and the gasket 13a, and laminating the catalyst coated membrane 10 and the gasket 13b.

The electrolyte membrane with gaskets 34a, which has been produced by the pressure bonding set forth above, is wound in roll form by the winding roller 20.

The manufacturing apparatus 2 for electrolyte membrane with gaskets according to the second embodiment set forth above makes it possible to manufacture the electrolyte membrane with gaskets 34 each having the catalyst coated membrane 10, on both sides of which the gaskets 13a and 13b have been mounted with their good shapes.

EXAMPLES

Next, let us describe examples of the present invention.

First, the catalyst coated membrane 10 and the adhesive-coated gasket 13 were installed in the manufacturing apparatus 1. As the polymer electrolyte membrane 12 of the catalyst coated membrane 10, "Nation 212" (Nafion® manufactured by DuPont) was used. A carbon-supported platinum catalyst, whose trade name is "TEC10E50E", manufactured by Tanaka Kikinzoku Kogyo, a polyelectrolyte solution of 20 percent by mass, whose registered trade mark is "Nation" from DuPont, and a mixed solvent of water and ethanol were mixed, and the mixture was subjected to a dispersion process by a planetary ball mill, so that ink was prepared. Transfer method using the ink formed the catalyst layers 11. As the adhesive-coated gasket 13, ST 38 manufactured by Panac, which had been punched to form the openings 131 by a punching machine, was used. The catalyst layer 11 is 50 mm square in plan view, and the opening 131 of the gasket 13 is 52 mm square.

Next, while the temperature of the pressure bonding roller with protrusions 21 and the pressure bonding roller 22 was set to 24° C., the transfer speed was set to 0.05 m/min, and the lamination pressure was set to 20 MPa, ten electrolyte membranes with gaskets 14 were manufactured by the manufacturing apparatus 1. Thereafter, for each electrolyte membrane with gaskets 14 manufactured set forth above, the gaps between the central coordinates of each gasket opening 131 and the central coordinates of a corresponding catalyst layer were calculated. In contrast, ten electrolyte membranes with gaskets were manufactured by a known laminating apparatus for an electrolyte membrane with gaskets using cylindrical rollers, and for each of the ten gasketed membranes, the gaps between the central coordinates of each gasket opening and the central coordinates of a corresponding catalyst layer were calculated.

Comparing the gaps for the ten electrolyte membrane with gaskets 14 with those for the electrolyte membrane with gaskets based on the known laminating apparatus for an electrolyte membrane with gaskets, we demonstrated that the gaps for the ten electrolyte membranes with gaskets 14 were reduced in comparison to the gaps for the ten electrolyte membranes with gaskets membranes based on the known laminating apparatus for an electrolyte membrane with gaskets. We also demonstrated that yields were improved.

Embodiments of the present invention are not limited to the aforementioned embodiments and examples. Adding modifications, such as design changes and the like, to the aforementioned embodiments and examples based on the knowledge of one skilled in the art can be made. These modified embodiments and examples should be included in the scope of the embodiments of the present invention.

INDUSTRIAL APPLICABILITY

The present invention is useful as manufacturing apparatuses and methods capable of efficiently manufacturing electrolyte membranes with gaskets having excellent qualities.

DESCRIPTION OF CHARACTERS 1, 2 Manufacturing apparatus for an electrolyte membrane with gaskets
10, 30 Catalyst Coated Membrane (CCM)
11, 11a, 11b Catalyst layer
12 Polymer electrolyte membrane
13, 13a, 13b Gasket
14, 34 Electrolyte membrane with gaskets
15 Adhesive
19a, 19b, 19c Feeding roller
20 Winding roller
21, 21a, 21b Pressure bonding roller with protrusions
22 Pressure bonding roller
23 Pressure device
24 Body
25 Protrusion
131 Opening

The invention claimed is:

1. A manufacturing apparatus for an electrolyte membrane with gaskets by laminating an electrolyte membrane having a predetermined region on which a catalyst layer is formed and a gasket formed with an opening shaped to match the shape of the region of the catalyst layer, the manufacturing apparatus for an electrolyte membrane with gaskets comprising:
a laminating roller that abuts on the gasket to laminate the electrolyte membrane and the gasket, the laminating roller having a surface on which a protrusion is formed, the protrusion being shaped to fit in the opening of the gasket; and
a controller that operates the laminating roller such that the electrolyte membrane and the gasket are laminated while the protrusion is fitted in the opening of the gasket.

2. The manufacturing apparatus for an electrolyte membrane with gaskets according to claim 1, wherein the protrusion of the laminating roller has a shape in plan view similar to a shape of the opening of the gasket.

3. The manufacturing apparatus for an electrolyte membrane with gaskets according to claim 2, wherein the protrusion of the laminating roller has a height that is substantially identical to a thickness of the gasket.

4. The manufacturing apparatus for an electrolyte membrane with gaskets according to claim 3, wherein the protrusion of the laminating roller is made from an elastic member.

5. The manufacturing apparatus for an electrolyte membrane with gaskets according to claim 2, wherein the opening has a plurality of sides forming a polygon shape surrounded by the plurality of sides, and the shape of the protrusion in plan view has a plurality of sides forming a polygon shape, a length of each side of the protrusion being shorter than that of a corresponding side of the opening by a range from 5 µm to 100 µm inclusive.

6. The manufacturing apparatus for an electrolyte membrane with gaskets according to claim 1, wherein the gasket has a band shape, the opening is provided in plurality, the plurality of openings are formed in the gasket at first regular intervals, the laminating roller has a cylindrical shape, the protrusion is provided in plurality, the plurality of protrusions are formed on an outer circumferential surface of the laminating roller at second regular intervals, the second regular intervals being previously determined to match the first regular intervals, and the controller turns the laminating roller to laminate the electrolyte membrane and the gasket while the plurality of protrusions are successively fitted in the plurality of openings.

7. The manufacturing apparatus for an electrolyte membrane with gaskets according to claim 1, wherein the laminating roller consists of two laminating rollers disposed to face each other, and the controller operates the two laminating rollers such that the gasket is laminated on each of front and back sides of the electrolyte membrane.

8. A manufacturing method for an electrolyte membrane with gaskets by laminating an electrolyte membrane having a predetermined region on which a catalyst layer is formed and a gasket formed with an opening shaped to match the shape of the region of the catalyst layer, the manufacturing method for an electrolyte membrane with gaskets comprising the steps of:
preparing a laminating roller having a surface on which a protrusion is formed, the protrusion being shaped to fit in the opening of the gasket;
placing the laminating roller such that the laminating roller abuts on the gasket while the protrusion is fitted in the opening of the gasket; and
operating the laminating roller such that the electrolyte membrane and the gasket are laminated while the protrusion is fitted in the opening of the gasket.

* * * * *